Dec. 20, 1966   M. I. TAYLOR   3,292,368
AIRCRAFT ENGINE ASSEMBLY
Filed April 14, 1965   2 Sheets-Sheet 1
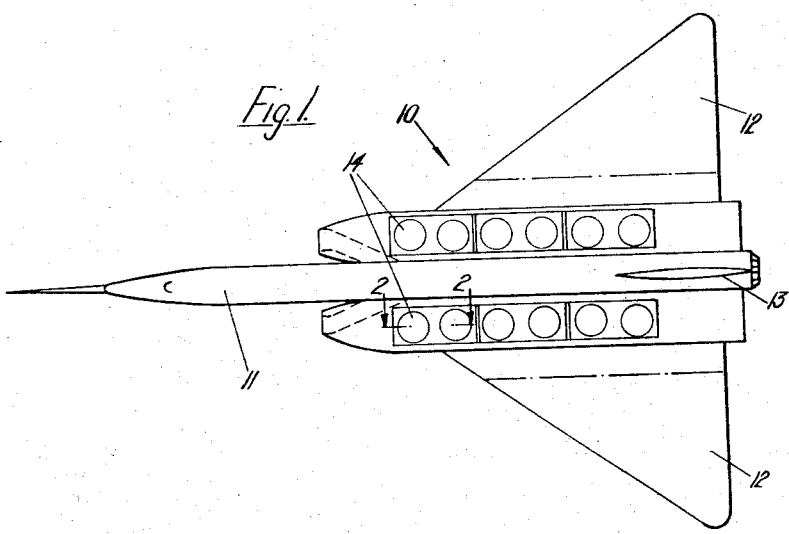
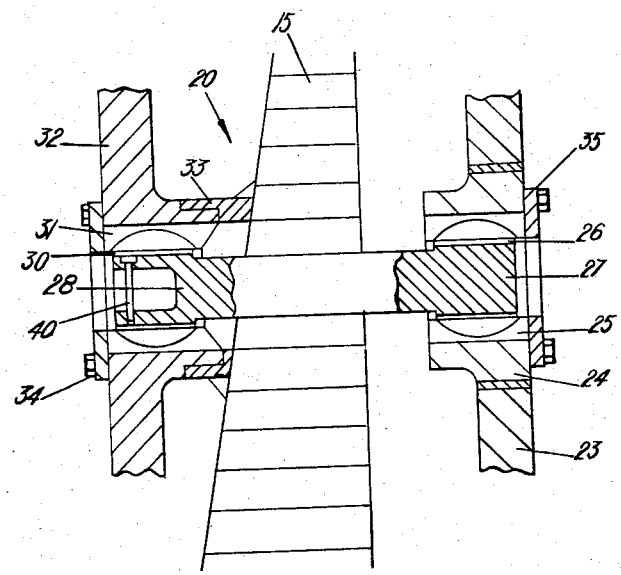

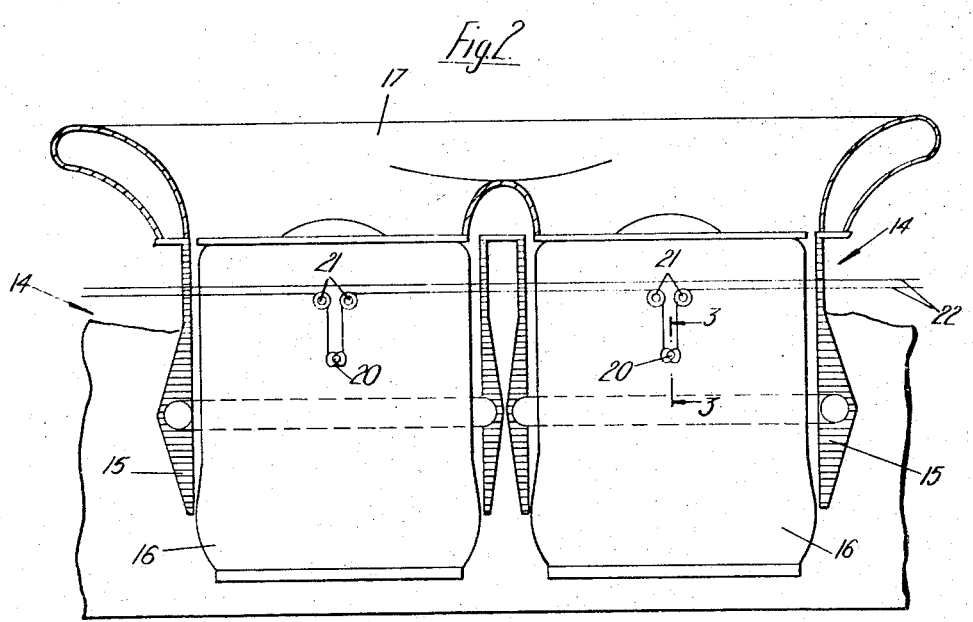

United States Patent Office 3,292,368
Patented Dec. 20, 1966

3,292,368
AIRCRAFT ENGINE ASSEMBLY
Maurice Ian Taylor, Derby, England, assignor to Rolls-Royce Limited, Derby, England, a company of Great Britain
Filed Apr. 14, 1965, Ser. No. 448,158
Claims priority, application Great Britain, Nov. 5, 1964, 45,198
7 Claims. (Cl. 60—39.31)

This invention concerns an aircraft engine assembly and, although not so restricted it will hereinafter be described with reference to its use with a vertical lift jet propulsion engine.

According to the present invention there is provided an aircraft engine assembly comprising an engine housing, an engine disposed therein and a control linkage for transmitting rotary motion between the housing and the engine, said linkage comprising a first rotatable member mounted on the housing, a second rotatable member mounted on the engine and a shaft removably connected to said first and second rotatable members by splined connections.

The use of a splined shaft which is removably connected between the housing and the engine provides an assembly which can be assembled and dismantled very rapidly since, upon sliding the splined shaft through the engine housing and thus disconnecting it from the engine itself, the engine (provided any other connections between the housing and engine have been removed), can be extracted from the housing in a simple sliding movement. The splined shaft can provide an efficient and very rapidly assembled connection between the housing and engine. A further advantage of the arrangement is that it can provide a particularly light-weight assembly and the splined connection to the housing and engine casing can be substantially flush therewith thus providing no protuberances which may hinder assembly and dismantling of the engine and housing.

Each of the splined connections preferably includes a plurality of angularly spaced apart, longitudinally extending splines on an end of said shaft, the radially outer edges of the splines being arcuate to permit relative movement between and allow for misalignment of said housing and engine.

In a preferred embodiment the splined connections are so arranged that the shaft can be attached to said first and second rotatable members in only one relative position of these members.

The first rotatable member may comprise a pulley mounted on the housing, and said second rotatable member may comprise a bush rotatably mounted in the casing of said engine.

Preferably, cover plates are provided on the outer face of said pulley and the inner face of said bush to limit movement of said shaft.

The control linkage may form part of the fuel control system of the engine.

The invention also includes an aircraft provided with an engine assembly as set forth above.

The invention is illustrated merely by way of example in the accompanying drawings, in which:

FIGURE 1 is a plan view of an aircraft provided with engine assemblies according to the present invention;

FIGURE 2 is a part sectional elevation on the line 2—2 of FIGURE 1; and

FIGURE 3 is a part sectional elevation on the line 3—3 of FIGURE 2.

Referring to the drawings there is shown an aircraft 10 having a fuselage 11 and wings 12. The aircraft is provided with a gas turbine forward propulsion engine 13 disposed in the fuselage 11 and with six pairs of gas turbine jet propulsion vertical lift engine assemblies 14 mounted in housings on either side of the fuselage.

Referring to FIGURE 2 there is shown one pair of vertical lift engine assemblies. Each engine assembly 14 comprises a housing 15 within which there is disposed a gas turbine jet propulsion vertical lift engine 16. Each pair of engine assemblies is provided with a common air inlet 17 formed of an inflatable annulus shown inflated in FIGURE 2.

Each of the engine housings 15 is formed of "honeycomb" material to provide a structure which is extremely rigid yet light. The housings 15 are so dimensioned as to be disposed closely about the casings of the engines 16 and yet provide sufficient clearance to enable the engines 16 to be slid into and out of the housings 15 as required.

The engines 16 are provided with fuel control systems disposed within the engines themselves. The fuel control throttle (not shown) of each engine is adapted to be rotated by a linkage system including a control linkage 20 disposed radially with respect to the engine 16 and housing 15 and extending across them. The control linkage 20 is adapted to be rotated by a pulley system including pulleys 21 and control wires 22 which are common to each pair of engine assemblies 14.

Referring to FIGURE 3 a control linkage 20 is shown in more detail. As seen in FIGURE 3 a casing 23 of an engine 16 is provided with a rotatably mounted bush 24 which is splined as at 25 to engage splines 26 of a shaft 27. Shaft 27 has its opposite end 28 provided with a plurality of splines 30 which mesh with splines 31 formed on a pulley wheel 32. Pulley wheel 32 is rotatably mounted within a boss 33 welded to the outer face of housing 15. A cover plate 34 is bolted to the outer face of pulley 32 and a cover plate 35 is bolted to the inner face of bush 24 to limit axial movement of the shaft 27.

Wires 22 pass around pulley wheel 32. Rotary movement of pulley wheel 32 caused by wires 22 will be transmitted to the bush 24 via shaft 27 through its splined connections with bush 24 and pulley 32. Bush 24 is connected (by means not shown) to the fuel control system of the engine 16 and thus the wires 22 can control fuel flow to the engine 16 directly.

As seen in FIGURE 3 each of the splines 26 and 30 have arcuate radially outer edges (considered with respect to the longitudinal axis of shaft 27). The arcuate edges permit relative movement between housing 15 and engine 16 and allow misalignment between the housing 15 and engine 16. Thus the connection between the housing 15 and the engine 16 provided by shaft 27 is not rigid.

By providing the splined connection through shaft 27 between the housing 15 and engine 16, an assembly is provided which can be rapidly assembled and dismantled. Thus by removing cover plate 34 a hook can be placed about a transversely disposed pin 40, at end 28 of shaft 27, and the shaft 27 can be withdrawn from the casing 23 and the housing 15 relatively easily. Provided there are no further connections between the housing 15 and the engine 16, the engine 16 can be withdrawn from the housing 15 quite readily. To reassemble the assembly, engine 16 is slid into the housing 15 and shaft 27 is slid into position as shown in FIGURE 3. The splined connections between the shaft 27 and the bush 24 and pulley 32 are such that shaft 27 can be slid into engagement with these members in only one relative position of these members. This is of importance in the arrangement shown since it is imperative that a particular position of pulley wheel 32 should correspond with a particular setting of the fuel control throttle. In this way all engines will be operated under like conditions upon movement of the common control wires 22.

Although described with reference to its use on vertical lift gas turbine engines, it will be appreciated that the control linkage shown in FIGURE 3 is equally applicable to any aircraft engine assembly where rapid assembly and dismantling is required between an engine and its housing.

I claim:
1. An aircraft engine assembly comprising an engine housing, an engine disposed therein, a first rotatable member mounted on the housing and having an axially extending bore, a plurality of axially extending splines provided internally of said bore, a second rotatable splined member mounted on the engine, and a shaft having a plurality of longitudinally extending splines at each end by which the shaft may be removably connected to the first and second rotatable members, the shaft having a size in relation to the bore of the first rotatable member such that said shaft is withdrawable from the assembly through said bore.

2. An aircraft engine assembly as claimed in claim 1 in which the radially outer edges of the splines on the shaft are arcuate to permit relative movement between and allow for misalignment of said housing and engine.

3. An aircraft engine assembly as claimed in claim 1 in which the shaft may be removably connected to said first and second rotatable members in one relative position only of these members.

4. An aircraft engine assembly as claimed in claim 1, said first rotatable member comprising a pulley rotatably mounted on the housing.

5. An aircraft engine assembly as claimed in claim 4, in which said second rotatable member comprises a bush rotatably mounted on the engine.

6. An aircraft engine assembly as claimed in claim 5 including cover plates provided on the outer face of said pulley and the inner face of said bush to limit movement of said shaft.

7. An aircraft engine assembly as claimed in claim 1 in which said first rotatable member comprises a throttle control member and the second rotatable member comprises a throttle valve.

References Cited by the Examiner
UNITED STATES PATENTS

| 2,437,385 | 3/1948 | Halford | 60—39.32 |
| 2,971,337 | 2/1961 | Wintrode | 60—35.6 |

FOREIGN PATENTS

| 914,232 | 6/1946 | France. |
| 903,835 | 8/1962 | Great Britain. |

MARK NEWMAN, *Primary Examiner.*
RALPH D. BLAKESLEE, *Examiner.*